US011810111B2

(12) United States Patent
Buradagunta et al.

(10) Patent No.: US 11,810,111 B2
(45) Date of Patent: Nov. 7, 2023

(54) METHOD AND SYSTEM FOR TRANSFERRING DIGITAL TOKENS TO AND FROM A PHYSICAL CARD

(71) Applicant: MASTERCARD INTERNATIONAL INCORPORATED, Purchase, NY (US)

(72) Inventors: Sarala Buradagunta, West Orange, NJ (US); Rakesh Yadav, Cape Elizabeth, ME (US); Sébastien Le Callonnec, Greystones (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 281 days.

(21) Appl. No.: 17/206,802

(22) Filed: Mar. 19, 2021

(65) Prior Publication Data

US 2021/0295331 A1    Sep. 23, 2021

Related U.S. Application Data

(60) Provisional application No. 62/992,842, filed on Mar. 20, 2020.

(51) Int. Cl.
| | | |
|---|---|---|
| G06Q 20/40 | (2012.01) | |
| G06Q 20/20 | (2012.01) | |
| G06Q 20/34 | (2012.01) | |
| G06Q 20/38 | (2012.01) | |
| H04L 9/32 | (2006.01) | |
| G06Q 20/02 | (2012.01) | |
| G06Q 20/06 | (2012.01) | |
| G06Q 20/10 | (2012.01) | |
| G06Q 20/36 | (2012.01) | |

(Continued)

(52) U.S. Cl.
CPC ......... *G06Q 20/401* (2013.01); *G06Q 20/20* (2013.01); *G06Q 20/341* (2013.01); *G06Q 20/3825* (2013.01); *H04L 9/3213* (2013.01); *H04L 9/3247* (2013.01); *G06Q 2220/00* (2013.01)

(58) Field of Classification Search
CPC .... G06Q 20/401; G06Q 20/20; G06Q 20/341; G06Q 20/3825; G06Q 2220/00; H04L 9/3213; H04L 9/3247
USPC ......................................................... 705/66
See application file for complete search history.

(56) References Cited

U.S. PATENT DOCUMENTS

2013/0304561 A1    11/2013  Warner et al.
2014/0289129 A1*   9/2014  Savolainen ............ G06Q 20/20
                                                             705/67

(Continued)

OTHER PUBLICATIONS

Moxey ("Project Sand Dollar: A Bahamas Payments System Modernisation Initiative", Central Bank of the Bahamas, Dec. 24, 2019, 33 pages (Year: 2019).*

(Continued)

*Primary Examiner* — James D Nigh
(74) *Attorney, Agent, or Firm* — Panitch Schwarze Belisario & Nadel LLP

(57) ABSTRACT

A method and system are disclosed for transferring digital tokens to and from a physical payment card. The method includes: receiving, on a processing server, a plurality of digital tokens issued from a central bank; and transferring, from the processing server, the plurality of digital tokens to the physical payment card, the physical payment card configured to be used with a point of sale (POS).

14 Claims, 4 Drawing Sheets

(51) Int. Cl.
*H04L 9/08* (2006.01)
*H04L 9/00* (2022.01)

(56) References Cited

U.S. PATENT DOCUMENTS

| | | |
|---|---|---|
| 2015/0254656 A1 | 9/2015 | Bondesen et al. |
| 2017/0103394 A1* | 4/2017 | Colhoun ............ G06Q 20/3672 |
| 2018/0053157 A1 | 2/2018 | Roffey |
| 2018/0285868 A1 | 10/2018 | O'Hara et al. |
| 2019/0043026 A1 | 2/2019 | Solis |
| 2019/0325407 A1* | 10/2019 | Zhou .................. G06Q 20/3274 |
| 2020/0090147 A1* | 3/2020 | Cole .................... G06Q 20/108 |

OTHER PUBLICATIONS

Houben et al. Bank for International Settlements (BIS) (2018), "Central Bank Digital Currencies," CPMI Papers No. 174 : https://www.bis.org/cpmi/publ/d174.pdf, Mar. 2018, 34 pages (Year: 2018).*

Shirai "Money and Central Bank Digital Currency", ABDI Institute, Oct. 2019, 29 pages (Year: 2019).*

Chuanwei et al. Blockchain Research Application of Multi-CBDC Bridge in Cross-border Payments, Hashkey Group, Apr. 27, 2022, 12 pages (Year: 2022).*

Auer et al. "The technology of retail central bank digital currency", BIS Quarterly Review, Mar. 2020, 16 pages (Year: 2020).*

H.R. 6321, U.S. House of Representatives, Mar. 23, 2020, 270 pages (Year: 2020).*

Central Bank Digital Currency Tracker, Central Bank Digital Currency Tracker-Atlantic Council, retrieved on Feb. 17, 2023, 6 pages (Year: 2023).*

Detrixhe, Central Banks are contemplating a world without cash, retrieved from https://qz.com/1810727/central-banks-are-researching-digital-currencies-to-replace-cash, Mar. 1, 2020, 6 pages (Year: 2020).*

Central Bank Digital Currency, Jan. 8, 2020, 47 pages (Year: 2020).*

Wasserman "FedNow Comments", Nov. 2019, 25 pages (Year: 2019).*

Notification of Transmittal of the International Search Report (Forms PCT/ISA/220 and PCT/ISA/210) and the Written Opinion of the International Searching Authority (Form PCT/ISA/237) dated Jul. 13, 2021, by the International Application Division Korean Intellectual Property Office in corresponding International Application No. PCT/US2021/023071. (17 pages).

* cited by examiner

METHOD AND SYSTEM FOR TRANSFERRING DIGITAL TOKENS TO AND FROM A PHYSICAL CARD

FIELD

The present disclosure relates to methods and systems for transferring digital tokens to and from a physical payment card, and more particularly method and systems of transferring digital tokens from a central bank to one or more insurers of physical payment cards.

BACKGROUND

Payment instrument includes, for instance, a credit card, virtual payment card, check, etc. The payment instrument may be encoded with, include, or be otherwise associated with payment credentials corresponding to a transaction account. The payment credentials may include any data that must be communicate as part of a transaction process for the transaction to be funded via the related transaction account, such as a primary account number, expiration date, and security code.

It would be desirable to have a technical system that enables a payment network to provide for physical payment cards that include digital tokens that can be used with a point of sale (POS).

SUMMARY

The present disclosure provides a description of systems and methods for transferring digital tokens to and from a physical payment card.

A method is disclosed for transferring digital tokens to and from a physical payment card, the method comprising: receiving, on a processing server, a plurality of digital tokens issued from a central bank; and transferring, from the processing server, the plurality of digital tokens to the physical payment card, the physical payment card configured to be used with a POS.

A system is disclosed for transferring digital tokens to and from a physical payment card, the system comprising: a processing server configured to: receive a plurality of digital tokens issued from a central bank; and transfer the plurality of digital tokens to the physical payment card, the physical payment card configured to be used with a POS.

BRIEF DESCRIPTION OF THE DRAWING FIGURES

Exemplary embodiments are best understood from the following detailed description when read in conjunction with the accompanying drawings. It is emphasized that, these are exemplary embodiments, to which the claimed invention is not limited. Included in the drawings are the following figures:

Figure 1:
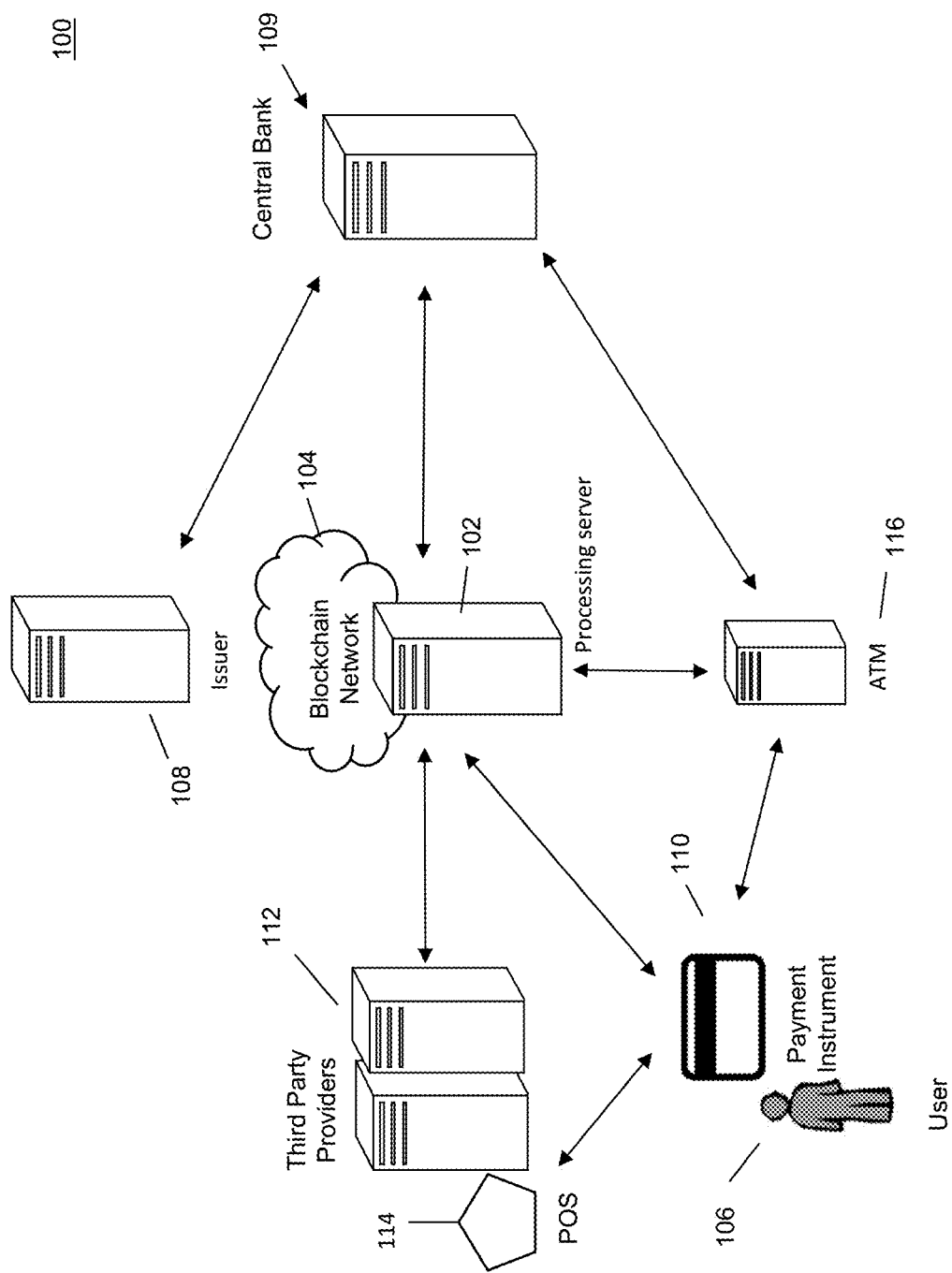
FIG. 1 is a block diagram illustrating a high level system architecture for transferring digital tokens to and from a physical payment card in accordance with exemplary embodiments.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Glossary of Terms

Blockchain—A public ledger of all transactions of a blockchain-based currency or network. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Third Party Provider or Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Central Bank—Generally a financial institution given privileged control over the production and distribution of money and credit for a nation or a group of nations, or other assets and other groups (e.g., fiat currency, cryptocurrency, other physical and digital assets used by groups of people). In the context of this document, this term refers to the computer systems and infrastructure of a central bank, except when taken in context it means a legal entity.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

System for Transferring Digital Tokens

FIG. 1 illustrates a system 100 for transferring digital tokens to and from a physical payment card.

In an embodiment, the system 100 may include one or more issuers 108, which may be a financial institution, such as an issuing bank, or other suitable entity that is configured to issue a transaction account to the user 106 for use in funding payment transactions with the payment instrument (i.e., a physical payment instrument or physical payment card) 110. The issuer or issuing institution 108 may issue as part of the issuing of the transaction account, the payment instrument 110 with digital tokens, for example, a bank issued EMV® card with individual digital tokens. Each of the digital tokens can be, for example, fiat money, that can be converted into a currency. The payment instrument 110 may be encoded with, include, or be otherwise associated with payment credentials corresponding to a transaction account. The payment credentials may include any data that must be communicate as part of a transaction process for the transaction to be funded via the related transaction account, such as a primary account number, expiration date, and security code. In accordance with an embodiment, each of digital tokens can have a value, which is associated with a micro-transaction in which the value of the digital token is relatively small and less than the costs of processing a transaction.

The system 100 may also include a processing server 102 associated with each of the one or more issuers 108 and/or the central bank 109. The processing server 102 may be one of a plurality of nodes or processors comprising a blockchain network 104. The blockchain network 104 may be associated with one or more blockchains, which may be used to store data associated with the issuer 108 (e.g., bank), the central bank 109, and/or the third-party providers (or merchants) 112 to record transactions involving the transfer of the digital tokens from the central bank 109 to each of the one or more issuers 108, and to the physical payment instrument 110 of each consumer or user 106. The processing server 102 may be configured to generate and validate new blocks that are added to the blockchain, where the validation process for a new block may involve mathematical verification of data stored therein across a plurality of the nodes comprising the blockchain network 104.

In accordance with an embodiment, a central bank 109 can issue a digital currency, for example, in the form of digital tokens to a plurality of issuers 108. Each of the plurality of issuers 108 in turn can issue payment instruments 110, in the form of an EMV card with individual digital tokens that can be used with a point of sale (POS) 114 at a third-party provider or merchant 112. In accordance with an embodiment, the digital tokens on the physical payment instrument 110 can include, for example, a digital signature and a cryptographic key (i.e., a token profile) for security purposes.

In accordance with an embodiment, the digital tokens issued to a physical payment instrument 110 can be associated with a prepaid card in which the consumer or user 106 has previously settled with the issuer 108 or paid for the digital tokens with the issuer 108. For example, the digital tokens (e.g., 1000 digital tokens) can be loaded onto the physical payment instrument 110 via an automated teller machine (ATM) 116. Alternatively, the digital tokens can be placed on the payment instrument 110, and upon the exchange of a group of digital tokens or aggregate of digital tokens over the payments rails between the third-party provider 112 and the issuer 108 for currency (e.g., U.S. dollars or other system of money for use in a particular country), the user 106 can settle with the issuer in accordance with terms and conditions as set forth in the payment instrument 110.

In accordance with an exemplary embodiment, the blockchain network 104 associated with the processing server 102 may be configured to store token profiles associated with digitized payment tokens issued by the central bank 109 to an issuer 108 and/or on a physical payment instrument 110. Each token profile may include a digitized payment token or information in identification thereof (e.g., a digital token number), the associated payment instrument in the form of a physical payment card with the respective digitized payment tokens. In some instances, the processing server 102 may be a token distribution platform or may be part of a computing system configured to operate as a token distribution platform, and may identify the data for token profiles as a result of functions performed in connection therewith.

In the system 100, for example, a user 106 may engage in a financial transaction or purchase of a service or product from a third-party provider or merchants 112 or other entities with, for example, a payment instrument (i.e., physical payment card) 110. In the system 100, the user (or consumer) 106 presents the payment card or payment instrument 110 having a plurality of digital tokens (e.g., 1000 digital tokens) to a point of sale (POS) 114. The POS 114 can be configured to verify the digital signature of the plurality of digital tokens on the payment instrument 110, for example, via the processing server 102 and the blockchain network 104 of the issuer 108.

Upon verification that the digital tokens are valid, the POS 114 can deduct a number of tokens (e.g., 50 digital tokens) from the plurality of digital tokens (e.g., 1000 digital tokens) on the physical payment instrument 110 for the service or product purchased by the user or consumer 106 at the third-party provider. The deducted tokens (e.g., 50 digital tokens) can then be stored by the third-party provider 112 until exchanged either individually or with a group or aggregate of digital tokens over the payment rails, for example, as non-financial communications.

Processing Server

Figure 2:
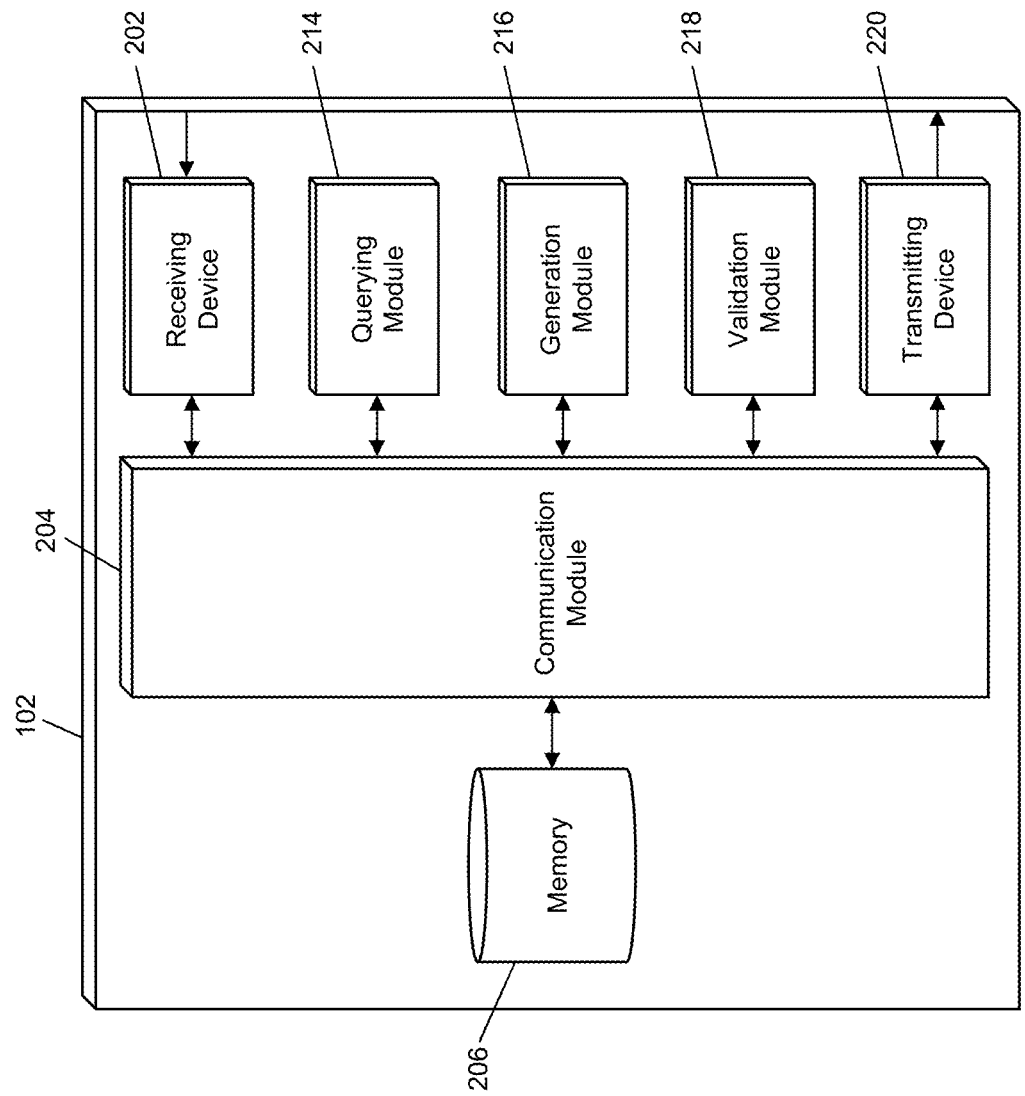
FIG. 2 is a block diagram illustrating the processing server of FIG. 1 for transferring digital tokens to and from a physical payment card.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 400 illustrated in FIG. 4 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from issuer 108 and third-party providers or merchant systems 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuer 108, which may be accompanied by authentication information to authenticate the issuer 108 (i.e., issuing institution) as the source of the data, which may, in some instances, include a digital signature generated via a private key associated with the issuer 108 (or issuing institution). The receiving device 202 may also be configured to receive data signals electronically transmitted by third-party providers or merchant systems 112, as applicable.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein. In some embodiments, the processing device may include and/or be comprised of a plurality of engines and/or modules specially configured to perform one or more functions of the processing device, such as a querying module 214, generation module 216, validation module 218, etc. As used herein, the term "module" may be software executed on hardware or hardware otherwise configured to receive an input, perform one or more processes using the input, and provides an output. The input, output, and processes performed by various modules will be apparent to one skilled in the art based upon the present disclosure.

The processing server 102 may include a memory 206. The memory 206 may be configured to store data for use by the processing server 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store a blockchain. As discussed above, the blockchain may be comprised of a plurality of blocks, where each block may be comprised of at least a block header and one or more data values. Each block header may include a time stamp, a block reference value referring to the preceding block in the blockchain, and a data reference value referring to the one or more data values included in the respective block. The memory may also be configured to store any additional data that may be used by the processing server 102 in performing the functions discussed herein, such as hashing algorithms for generating reference values for the blockchain, communication data for communicating with other blockchain nodes and other computing devices, access data for providing access to third-party providers or merchant systems 112 to blockchain data, public keys corresponding to private keys provisioned to issuer 108 for verification of digital signatures, etc.

The processing server 102 may include a querying module 214. The querying module 214 may be configured to execute queries on databases to identify information. The querying module 214 may receive one or more data values or query strings and may execute a query string based thereon on an indicated database, such as the memory 206, to identify information stored therein. The querying module 214 may then output the identified information to an appropriate engine or module of the processing server 102 as necessary. The querying module 214 may, for example, execute a query on the memory 206 to identify a the most recent block added to the blockchain (e.g., based on timestamp) as part of the process in generating a new block, or may execute a query on the memory 206 to identify a public key corresponding to the issuer 108 for use in validating a digital signature provided with data associated with the type of services or functions provided by the issuer 108, the central bank 109, and/or the third-party provider 112 for authentication thereof.

The processing server 102 may also include a generation module 216. The generation module 216 may be configured to generate data for the processing server 102 for use in performing the functions discussed herein. The generation module 216 may receive instructions as input, may generate data based on the instructions, and may output the generated data to one or more modules or engines of the processing server 102. For example, the generation module 216 may be configured to generate new blocks and new block headers for confirmation and addition into the blockchain. The generation module 216 may also be configured to generate hash values via the application of hashing algorithms to data, such as for the generation of reference values to be included in the block header of a newly generated block. In some cases, the generation of hash values may be performed via a separate hashing module included in the processing server 102.

The processing server 102 may also include a validation module 218. The validation module 218 may be configured to validate data for the processing server 102 and the issuer 108 for use in performing the functions discussed herein. The validation module 218 may receive instructions as input, may validate data as instructed, and may output a result of the validation to another module or engine of the processing server 102.

The processing server 102 may also include a transmitting device 220. The transmitting device 220 may be configured to transmit data over one or more networks via one or more network protocols. In some instances, the transmitting device 220 may be configured to transmit data in the blockchain network 104 to the issuer 108, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

Process Flow

Figure 3:
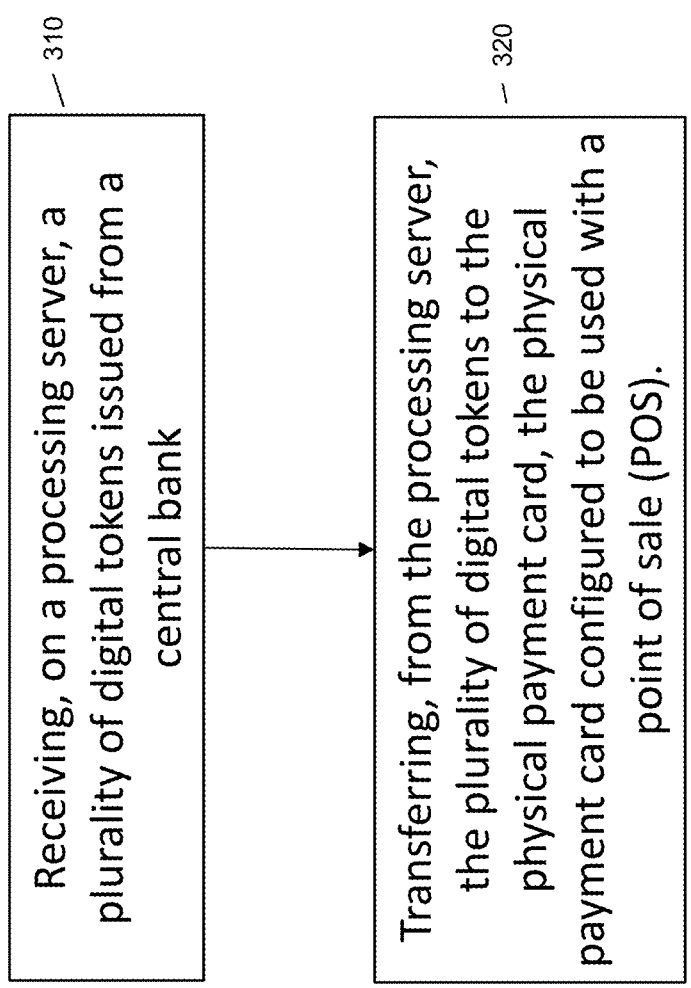
FIG. 3 is a flowchart illustrating an exemplary method in accordance with exemplary embodiments.

FIG. 3 is a flowchart illustrating an exemplary method for transferring digital tokens to and from a physical payment card in accordance with exemplary embodiments. The method 300 includes receiving 310, on a processing server, a plurality of digital tokens issued from a central bank and transferring 320, from the processing server, the plurality of digital tokens to the physical payment card, the physical payment card configured to be used with a POS. The method may also comprise including a digital signature and a cryptographic key for the plurality of digital tokens on the physical payment card, and may also comprise verifying the digital signature and the cryptographic key upon a presentation of the physical payment card at the POS. Further, the method may include deducting digital tokens from the plurality of digital tokens upon a presentation of the physical payment card to the POS. Further, the method may include uploading the plurality of digital tokens to the physical payment card via an automated teller machine (ATM). Additionally, the method may further include recording, in a blockchain network 104, each transfer of a digital token to and from the processing server. Here, the processing server 102 may be associated with an issuer 108. Also, the physical payment instrument 110 may be an EMV card with individual digital tokens.

Computer System Architecture

Figure 4:
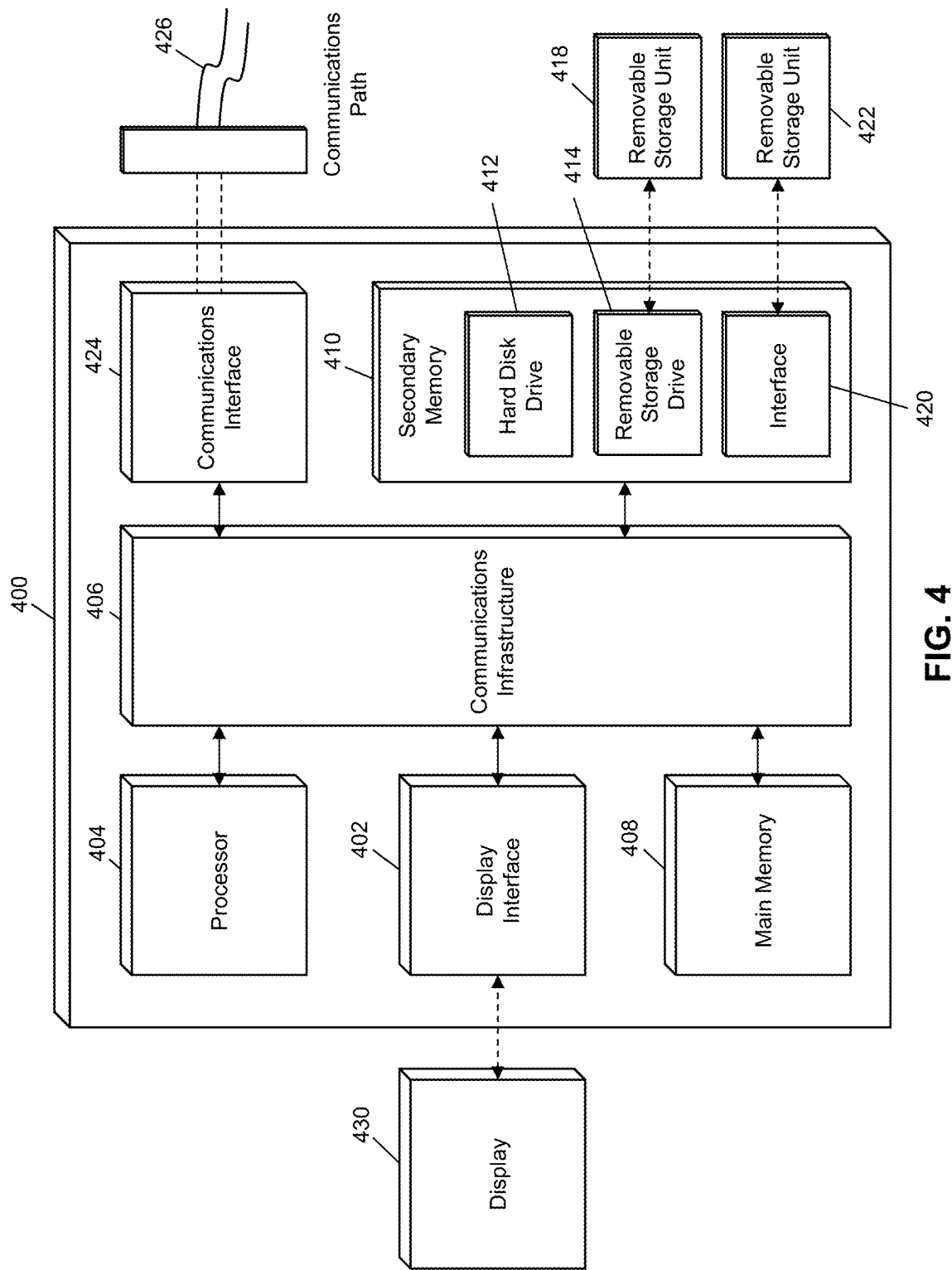
FIG. 4 is a block diagram illustrating a computer system architecture in accordance with exemplary embodiments.

FIG. 4 illustrates a computer system 400 in which embodiments of the present disclosure, or portions thereof, may be implemented as computer-readable code. For example, the processing server 102 of FIG. 1 may be implemented in the computer system 400 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the processes as disclosed herein.

If programmable logic is used, such logic may execute on a commercially available processing platform specifically configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412, etc.

Various embodiments of the present disclosure are described in terms of this example computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general-purpose processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the system illustrated by FIG. 1 as discussed herein. Accordingly, such computer programs may represent controllers of the computer system 400. Where the present disclosure is implemented using software, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for providing a service node within a blockchain network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for transferring digital tokens to and from a physical payment card, the method comprising:
    receiving, on a processing server, a plurality of digital tokens issued from a central bank;
    transferring, from the processing server, the plurality of digital tokens to the physical payment card, the physical payment card configured to be used with a point of sale (POS);
    subsequent to transferring the plurality of digital tokens to the physical payment card, communicating, by the processing server, with a blockchain network that stores token profiles associated with the plurality of digital tokens issued from the central bank; and
    recording, by the processing server, in the blockchain network, each transfer of a digital token to and from the processing server.

2. The method according to claim 1, comprising:
    Including at least a digital signature for the plurality of digital tokens on the physical payment card, wherein the digital signature is associated with an issuer of the physical payment card.

3. The method according to claim 2, comprising:
    verifying the digital signature upon a presentation of the physical payment card at the point of sale (POS).

4. The method according to claim 1, comprising:
    deducting digital tokens from the plurality of digital tokens upon a presentation of the physical payment card to the point of sale (POS).

5. The method according to claim 1, comprising:
    uploading the plurality of digital tokens to the physical payment card via an automated teller machine (ATM).

6. The method according to claim 1, wherein the processing server is associated with an issuer.

7. The method according to claim 1, wherein the physical payment card is an EMV card with individual digital tokens.

8. A system for transferring digital tokens to and from a physical payment card, the system comprising:

a processing server in communication with a blockchain network that stores token profiles associated with the plurality of digital tokens issued from the central bank, said processing server is configured to:

receive a plurality of digital tokens issued from a central bank;

transfer the plurality of digital tokens to the physical payment card, the physical payment card configured to be used with a point of sale (POS);

communicate, subsequent to the transferring of the plurality of digital tokens to the physical payment card, with the blockchain network; and record, in the blockchain network, each transfer of a digital token to and from the processing server.

9. The system according to claim 8, wherein
the plurality of digital tokens on the physical payment card include at least a digital signature associated with an issuer.

10. The system according to claim 9, wherein at least the digital signature is verified upon a presentation of the physical payment card at the point of sale (POS).

11. The system according to claim 8, wherein digital tokens are deducted from the plurality of digital tokens upon a presentation of the physical payment card to the point of sale (POS).

12. The system according to claim 8, wherein the plurality of digital tokens are uploaded to the physical payment card via an automated teller machine (ATM).

13. The system according to claim 8, wherein the processing server is associated with an issuer.

14. The method according to claim 8, wherein the physical payment card is an EMV card with individual digital tokens.

* * * * *